(12) United States Patent
Gopal et al.

(10) Patent No.: US 11,816,451 B2
(45) Date of Patent: Nov. 14, 2023

(54) METHOD AND SYSTEM FOR IDENTIFYING COMMON REQUIREMENTS FROM APPLICATIONS

(71) Applicant: HCL Technologies Limited, New Delhi (IN)

(72) Inventors: Krishna Kumar Gopal, Chennai (IN); Hareendran M, Chennai (IN); Shrwan Kumar, Noida (IN); Vinod Kumar, Noida (IN); Maheswari V. S, Chennai (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 17/670,513

(22) Filed: Feb. 14, 2022

(65) Prior Publication Data

US 2022/0261222 A1 Aug. 18, 2022

(51) Int. Cl.
*G06F 8/10* (2018.01)
*G06F 16/22* (2019.01)

(52) U.S. Cl.
CPC ............ *G06F 8/10* (2013.01); *G06F 16/2246* (2019.01)

(58) Field of Classification Search
CPC .................................................. G06F 16/2246
USPC .................................................. 717/104–120
See application file for complete search history.

(56) References Cited

U.S. PATENT DOCUMENTS

| | | | |
|---|---|---|---|
| 6,021,383 A * | 2/2000 | Domany | G06F 16/35 702/182 |
| 7,395,131 B2 * | 7/2008 | Funk | G05B 15/02 702/182 |
| 7,444,621 B2 | 10/2008 | Pletcher et al. | |
| 7,774,743 B1 * | 8/2010 | Sanchez | G06Q 10/06 717/102 |
| 8,185,486 B2 * | 5/2012 | Eder | G06Q 40/00 706/45 |
| 8,935,654 B2 * | 1/2015 | Sengupta | G06F 11/3684 717/124 |
| 10,255,046 B2 * | 4/2019 | Alexander | G06F 8/33 |
| 10,255,065 B1 | 4/2019 | Jensen | |
| 10,430,250 B2 | 10/2019 | Ishikawa et al. | |
| 10,564,988 B1 * | 2/2020 | Jose | G06F 8/65 |

(Continued)

OTHER PUBLICATIONS

Al-Debagy et al, "A Comparative Review of Microservices and Monolithic Architectures", IEEE, pp. 100149-000154 (Year: 2018).*

(Continued)

*Primary Examiner* — Anil Khatri

(57) ABSTRACT

This disclosure relates to method and system for identifying common requirements from applications. The method includes receiving a plurality of requirements from a plurality of applications. For at least two of the plurality of requirements, the method further includes determining a similarity index through each of a set of analysis techniques. For at least two of the plurality of requirements, the method further includes calculating a final similarity index based on the similarity index determined through each of a set of analysis techniques. The method further includes generating a similarity matrix for the plurality of requirements based on the final similarity index. The method further includes generating a hierarchical cluster tree for the plurality of requirements based on the final similarity index corresponding to each of the plurality of requirements.

16 Claims, 11 Drawing Sheets

(56) References Cited

U.S. PATENT DOCUMENTS

| | | | |
|---|---|---|---|
| 10,579,370 | B2 | 3/2020 | Gupta |
| 10,769,046 | B2 * | 9/2020 | Wang ................. G06F 11/3616 |
| 10,956,179 | B1 * | 3/2021 | Moturu ............. G06F 3/04817 |
| 11,068,261 | B1 * | 7/2021 | Katdare ..................... G06F 8/77 |
| 11,269,876 | B1 * | 3/2022 | Basavaiah ................ G06F 8/77 |
| 11,327,750 | B1 * | 5/2022 | Chawda ..................... G06F 9/22 |
| 11,474,819 | B1 * | 10/2022 | Kapoor ............. G06Q 10/0637 |
| 11,567,760 | B2 * | 1/2023 | Harishankar ............. G06F 8/76 |
| 11,620,128 | B1 * | 4/2023 | Chawda ..................... G06F 8/75 |
| | | | 717/120 |
| 2008/0148225 | A1 * | 6/2008 | Sarkar ....................... G06F 8/70 |
| | | | 717/107 |
| 2020/0175041 | A1 * | 6/2020 | Ramachandra Iyer ...................... |
| | | | G06F 16/24578 |
| 2020/0371760 | A1 | 11/2020 | Gass et al. |

OTHER PUBLICATIONS

Freitas et al, "Refactoring Java Monoliths into Executable Microservice-Based Applications", ACM, pp. 100-107 (Year: 2021).*

Wu et al, "Deep Uncoupled Discrete Hashing via Similarity Matrix Decomposition", ACM, pp. 1-22 (Year: 2023).*

Stoerzer et al, "Using Pointcut Delta Analysis to Support Evolution of Aspect-Oriented Software", IEEE, pp. 1-4 (Year: 2005).*

Lee et al, "Unsupervised Multistage Image Classification Using Hierarchical Clustering With a Bayesian Similarity Measure", IEEE, pp. 312-320 (Year: 2005).*

Zhang et al, "Review of Clustering Methods for Functional Data", ACM, pp. 1-34 (Year: 2023).*

Wuxia Jin, Ting Liu, Qinghua Zheng, Di Cui, and Yuanfang Cai; Functionality-oriented Microservice Extraction Based on Execution Trace Clustering; Jul. 2018; pp. 211-218.

* cited by examiner

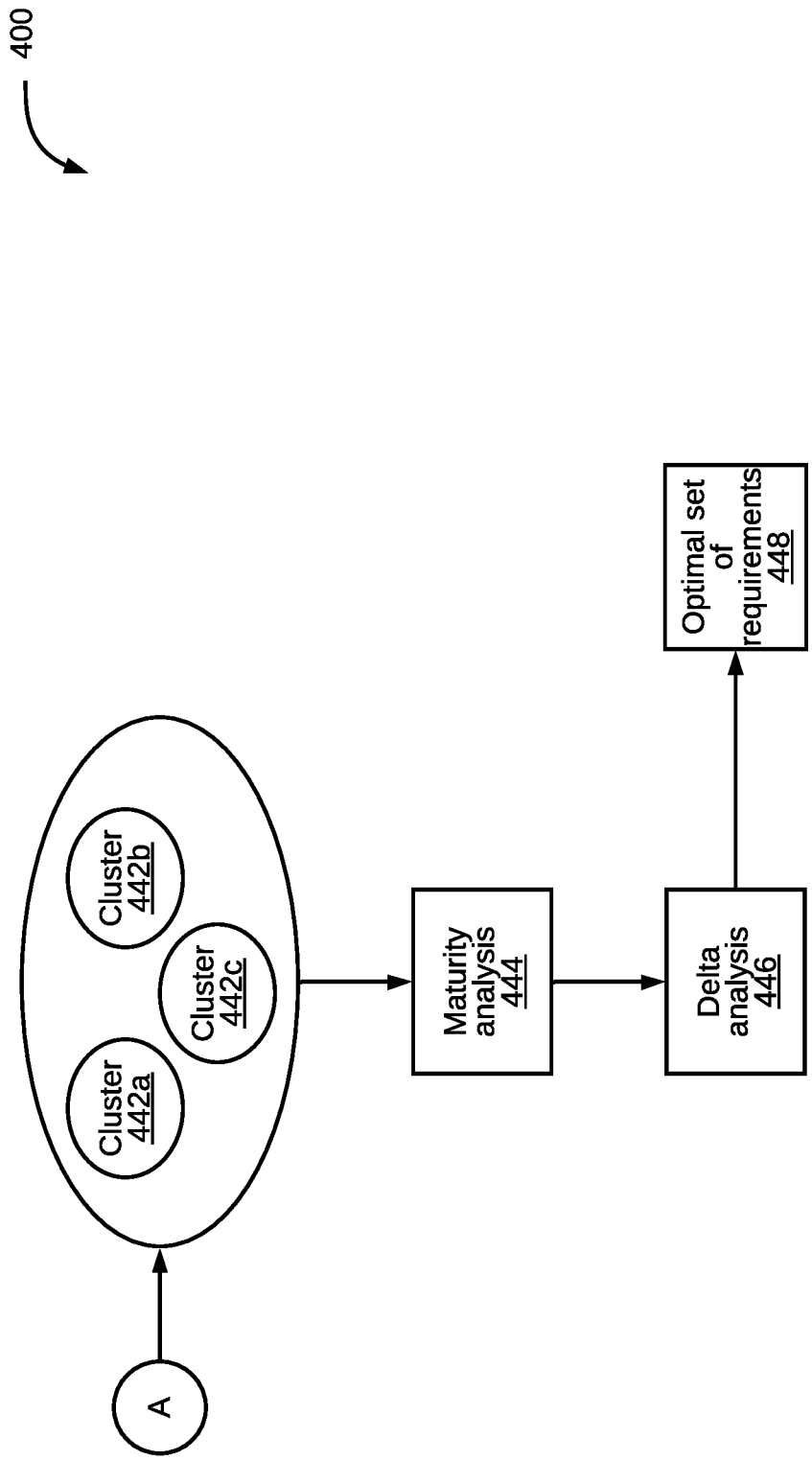

| Requirement A1R1 | A1R1-PF1 | A1R1-PF2 | A1R1-PF3 | A1R1-PF4 | A1R1-PF5 | A1R1-PF6 | A1R1-PF7 | A1R1-PF8 | A1R1-PF9 | A1R1-PF10 | |
|---|---|---|---|---|---|---|---|---|---|---|---|
| Requirement A2R1 | A2R1-PF1 | A2R1-PF2 | A2R1-PF3 | A2R1-PF4 | A2R1-PF5 | A2R1-PF6 | A2R1-PF7 | A2R1-PF8 | A2R1-PF9 | A2R1-PF10 | |
| Weightage 602 | 20% | 5% | 15% | 3% | 2% | 25% | 5% | 2% | 3% | 10% | |
| Process level Similarity Index 604 | 80 | 20 | 70 | 60 | 25 | 40 | 60 | 0 | 0 | 40 | Requirement Level Similarity Index 608 |
| Effective SI 606 | 16 | 1 | 10.5 | 1.8 | 0.5 | 10 | 3 | 0 | 0 | 4 | 46.8 |

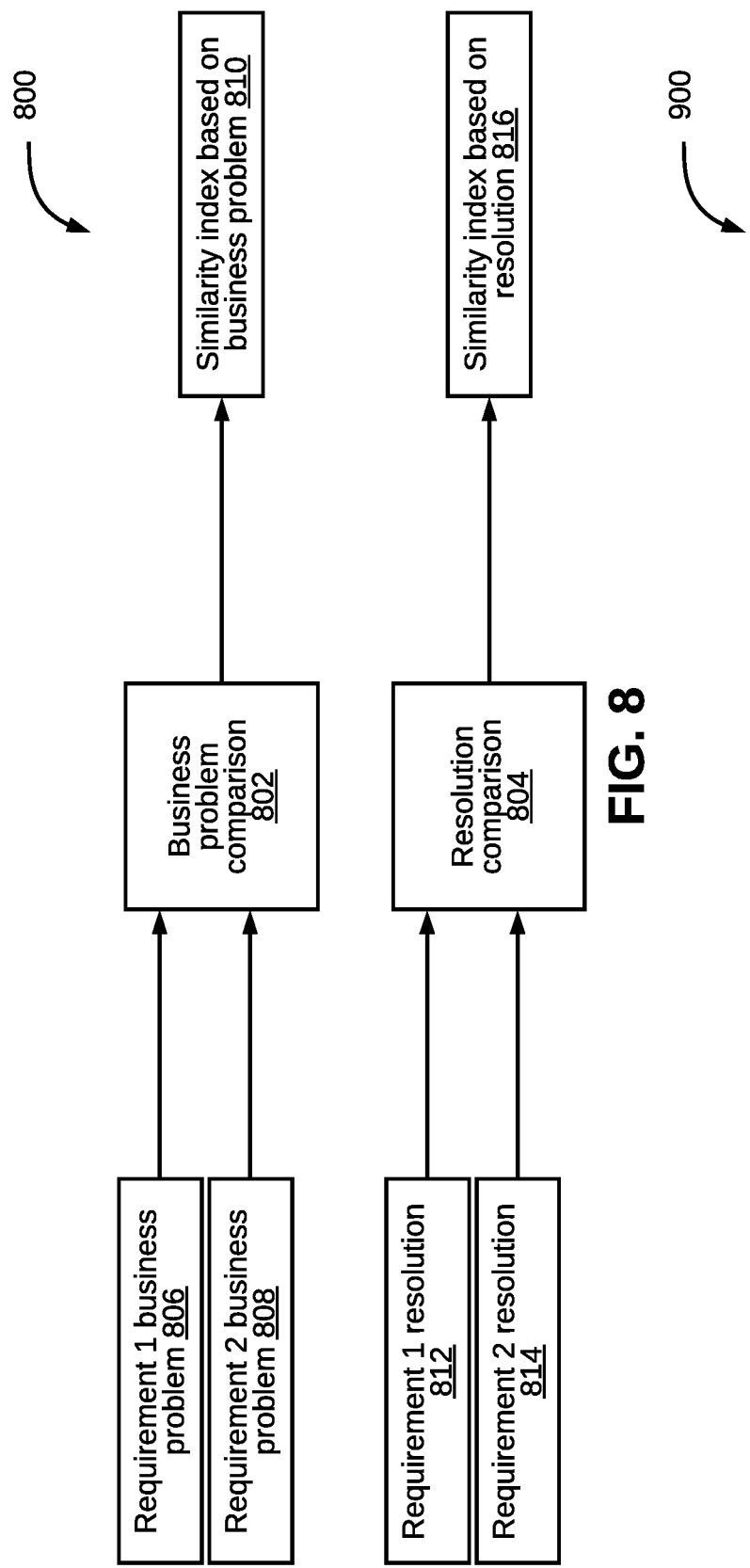

| | Performance 1102 | Code Quality 1104 | Error Handling 1106 | Usage in Production 1108 | Technology weightage 1110 | Total 1112 | Rank 1114 |
|---|---|---|---|---|---|---|---|
| A1R1 | 5 | 5 | 5 | 5 | 5 | 30 | 1 |
| A2R1 | 4 | 4 | 4 | 4 | 5 | 21 | 2 |

METHOD AND SYSTEM FOR IDENTIFYING COMMON REQUIREMENTS FROM APPLICATIONS

TECHNICAL FIELD

This disclosure relates generally to monolith applications, and more particularly to method and system for identifying common requirements from applications.

BACKGROUND

In a large organization, multiple teams may develop several monolith applications with similar functionalities based on team perspective and needs. Alternately, monolith applications with similar functionalities may have been procured from different vendors over different timelines. Many functionalities in such applications may be similar or overlapping with one or more functionalities in other applications. Due to differences in a technology stack across systems, the functionalities may be duplicated to accomplish a need.

For example, in a traffic management system and a parking management system, a module to capture image of a parked vehicle, fetch details about the vehicle such as make of the car, vehicle number, or the like, may be required by both systems. but when the two systems are developed on different technology stacks, the same module may be replicated. Therefore, this may lead to an increase in cost for resources such as assets for deploying same functionality with different technology stacks, man power for developing software with same functionality, etc. Further, reusability of such functionalities may not be feasible on different technology stacks.

The conventional techniques fail to obtain a common monolith application from a plurality of applications, particularly when the plurality of applications are based on different technology stacks. There is, therefore, a need in the present state of art for techniques to identify common requirements from applications of varying technology stacks and optimize the common requirements to generate a common monolith application.

SUMMARY

In one embodiment, a method for identifying common requirements from applications is disclosed. In one example, the method includes receiving a plurality of requirements from a plurality of applications. Each of the plurality of requirements corresponds to a functionality in one of the plurality of applications. For at least two of the plurality of requirements, the method further includes determining a similarity index through each of a set of analysis techniques. The set of analysis techniques includes a process driven analysis technique, a data driven analysis technique, and a consumer driven analysis technique. For at least two of the plurality of requirements, the method further includes calculating a final similarity index based on the similarity index determined through each of a set of analysis techniques. The final similarity index is a weighted average of the similarity index determined through each of a set of analysis techniques. The method further includes generating a similarity matrix for the plurality of requirements based on the final similarity index. Elements of the similarity matrix are final similarity indices corresponding to the plurality of requirements. The method further includes generating a hierarchical cluster tree for the plurality of requirements based on the final similarity index corresponding to each of the plurality of requirements.

In one embodiment, a system for identifying common requirements from applications is disclosed. In one example, the system includes a processor and a computer-readable medium communicatively coupled to the processor. The computer-readable medium may store processor-executable instructions, which, on execution, may cause the processor to receive a plurality of requirements from a plurality of applications. Each of the plurality of requirements corresponds to a functionality in one of the plurality of applications. For at least two of the plurality of requirements, the processor-executable instructions, on execution, may further cause the processor to determine a similarity index through each of a set of analysis techniques. The set of analysis techniques includes a process driven analysis technique, a data driven analysis technique, and a consumer driven analysis technique. For at least two of the plurality of requirements, the processor-executable instructions, on execution, may further cause the processor to calculate a final similarity index based on the similarity index determined through each of a set of analysis techniques. The final similarity index is a weighted average of the similarity index determined through each of a set of analysis techniques. The processor-executable instructions, on execution, may further cause the processor to generate a similarity matrix for the plurality of requirements based on the final similarity index. Elements of the similarity matrix are final similarity indices corresponding to the plurality of requirements. The processor-executable instructions, on execution, may further cause the processor to generate a hierarchical cluster tree for the plurality of requirements based on the final similarity index corresponding to each of the plurality of requirements.

In one embodiment, a non-transitory computer-readable medium storing computer-executable instructions for identifying common requirements from applications is disclosed. In one example, the stored instructions, when executed by a processor, may cause the processor to perform operations including receiving a plurality of requirements from a plurality of applications. Each of the plurality of requirements corresponds to a functionality in one of the plurality of applications. For at least two of the plurality of requirements, the operations may further include determining a similarity index through each of a set of analysis techniques. The set of analysis techniques includes a process driven analysis technique, a data driven analysis technique, and a consumer driven analysis technique. For at least two of the plurality of requirements, the operations may further include calculating a final similarity index based on the similarity index determined through each of a set of analysis techniques. The final similarity index is a weighted average of the similarity index determined through each of a set of analysis techniques. The operations may further include generating a similarity matrix for the plurality of requirements based on the final similarity index. Elements of the similarity matrix are final similarity indices corresponding to the plurality of requirements. The operations may further include generating a hierarchical cluster tree for the plurality of requirements based on the final similarity index corresponding to each of the plurality of requirements.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A and 4B illustrate a flow diagram of a detailed exemplary control logic for identifying common requirements from applications, in accordance with some embodiments.

FIG. 8 illustrates consumer-driven comparison between two requirements, in accordance with some embodiments.

FIG. 9 illustrates an exemplary similarity matrix for a plurality of requirements, in accordance with some embodiments.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
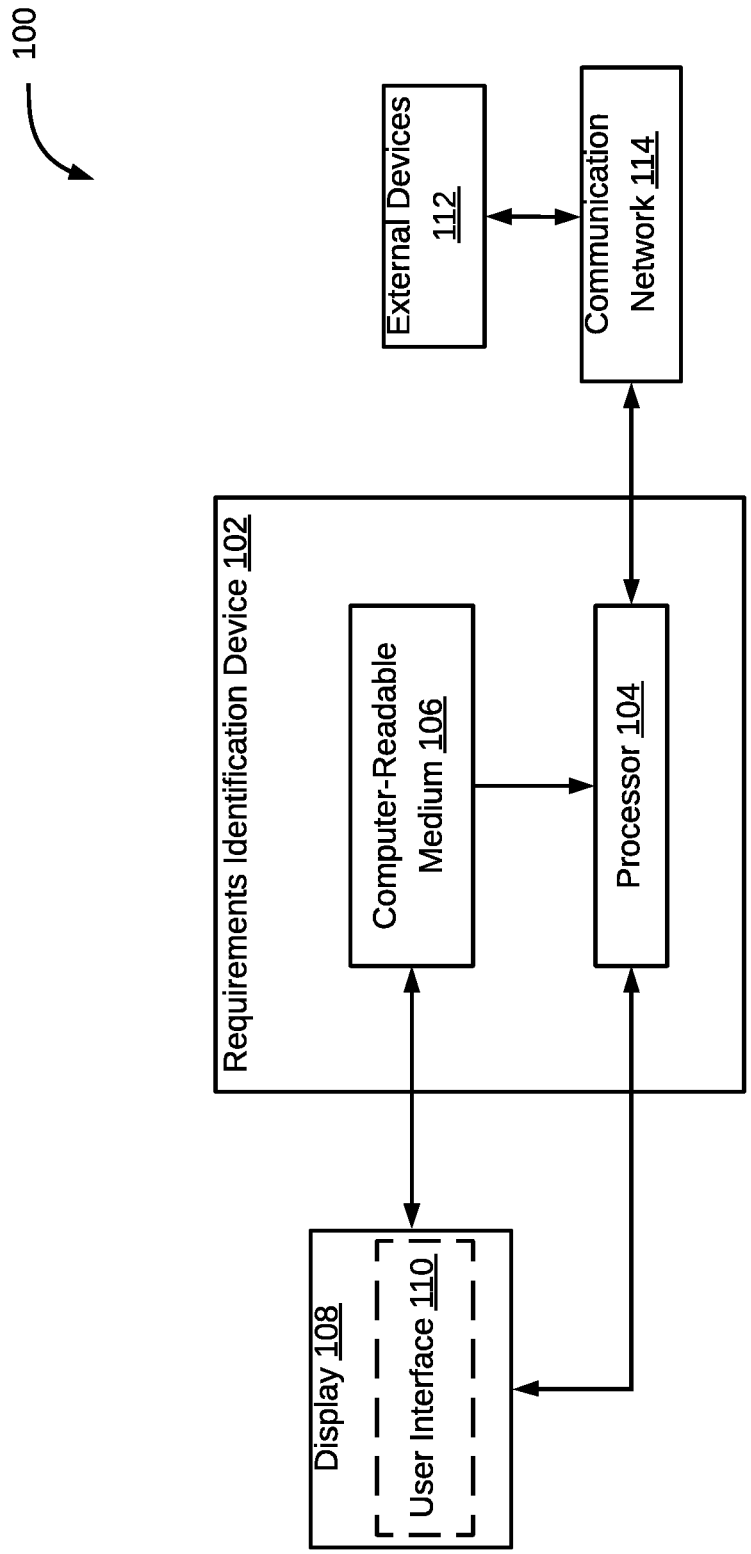
FIG. 1 is a block diagram of an exemplary system for identifying common requirements from applications, in accordance with some embodiments.

Referring now to FIG. 1, an exemplary system 100 for identifying common requirements from applications is illustrated, in accordance with some embodiments of the present disclosure. The system 100 may implement a requirements identification device 102 (for example, server, desktop, laptop, notebook, netbook, tablet, smartphone, mobile phone, or any other computing device), in accordance with some embodiments of the present disclosure. The requirements identification device 102 may identify common requirements from applications (such as, software applications, smartphone applications, web applications, etc.) based on a similarity index obtained by comparing a plurality of requirements of each of the applications. It should be noted that, in some embodiments, the requirements identification device 102 may generate a hierarchical cluster tree based on the similarity index to obtain the common requirements of the applications.

As will be described in greater detail in conjunction with FIGS. 2-12, the requirements identification device may receive a plurality of requirements from a plurality of applications. Each of the plurality of requirements may correspond to a functionality in one of the plurality of applications. For at least two of the plurality of requirements, the requirements identification device may further determine a similarity index through each of a set of analysis techniques. The set of analysis techniques may include a process driven analysis technique, a data driven analysis technique, and a consumer driven analysis technique. For at least two of the plurality of requirements, the requirements identification device may further calculate a final similarity index based on the similarity index determined through each of a set of analysis techniques. The final similarity index is a weighted average of the similarity index determined through each of a set of analysis techniques. The requirements identification device may further generate a similarity matrix for the plurality of requirements based on the final similarity index. Elements of the similarity matrix are final similarity indices corresponding to the plurality of requirements. The requirements identification device may further generate a hierarchical cluster tree for the plurality of requirements based on the final similarity index corresponding to each of the plurality of requirements.

In some embodiments, the requirements identification device 102 may include one or more processors 104 and a computer-readable medium 106 (for example, a memory). The computer-readable medium 106 may include a plurality of requirements corresponding to a plurality of applications. Further, the computer-readable storage medium 106 may store instructions that, when executed by the one or more processors 104, cause the one or more processors 104 to identify common requirements from applications, in accordance with aspects of the present disclosure. The computer-readable storage medium 106 may also store various data (for example, the plurality of requirements, similarity indices between at least two of the plurality of requirements, similarity matrix, cluster tree, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the requirements identification device 102 may interact with the one or more external devices 112 over a communication network 114 for sending or receiving various data. The external devices 112 may include, but may not be limited to, a remote server, a digital device, or another computing system.

Figure 2:
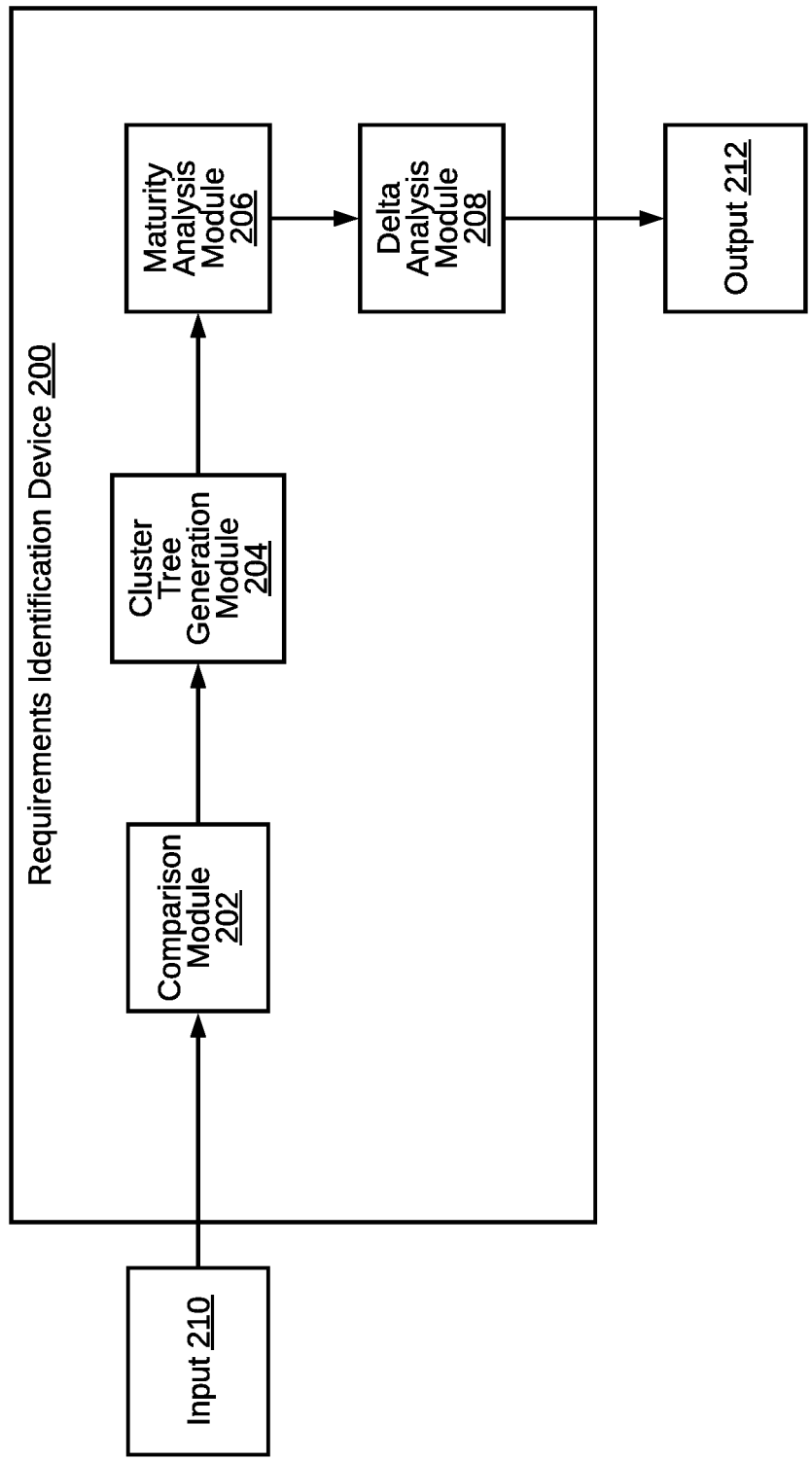
FIG. 2 illustrates a functional block diagram of a requirements identification device implemented by the exemplary system of FIG. 1, in accordance with some embodiments.

Referring now to FIG. 2, a functional block diagram of a requirements identification device 200 is illustrated, in accordance with some embodiments. In an embodiment, the requirements identification device 200 may include a comparison module 202, a cluster tree generation module 204, a maturity analysis module 206, and a delta analysis module 208. In such an embodiment, the requirements identification device 200 may be analogous to the requirements identification device 102 of the system 100.

The requirements identification device 200 may receive an input 210. By way of an example, the input 210 may be a plurality of applications or source code associated with each of the plurality of applications. In an embodiment, each of the plurality of applications may be a monolith application. The comparison module 202 may receive the input 210 and identify a plurality of requirements for each of the plurality of applications. Each of the plurality of requirements corresponds to a functionality of an application. In an embodiment, the plurality of requirements may be identified through a code analysis technique (such as, static code analysis, dynamic code analysis, etc.). Further, the comparison module 202 may compare the plurality of requirements in pairs through each of a set of analysis techniques. In an exemplary scenario, two applications may be received as the input 210. In such a scenario, each of the plurality of requirements of a first application may be compared with each of the plurality of requirements of a second application. In general, when n number of applications are received by the comparison module 202, the plurality of requirements corresponding to each of the n number of applications may be compared with the plurality of requirements corresponding to remaining n−1 applications.

A similarity index is determined between two requirements through each of the set of analysis techniques. In some embodiments, the set of analysis techniques includes a process driven analysis technique, a data driven analysis technique, and a consumer driven analysis technique. In such embodiments, three similarity indices are obtained. Further, a final similarity index is calculated using each of the three similarity indices. It may be noted that the final similarity index may be a weighted average of the three similarity indices. The final similarity index may be calculated for every two of the plurality of requirements corresponding to the plurality of applications.

The cluster tree generation module 204 receives the final similarity indices corresponding to the plurality of requirements. Further, the cluster tree generation module 204 generates a similarity matrix based on the final similarity indices. Elements of the similarity matrix are final similarity indices corresponding to the plurality of requirements. Further, the cluster tree generation module 204 generates a hierarchical cluster tree for the plurality of requirements based on the similarity matrix. Further, the cluster tree generation module 204 identifies at least one cluster of requirements from the plurality of requirements through the hierarchical cluster tree. It may be noted that the at least one cluster of requirements includes a set of requirements from the plurality of requirements. The final similarity indices corresponding to every two of the set of requirements within the at least one cluster are above a predefined threshold.

The maturity analysis module 206 receives the at least one cluster from the cluster tree generation module 204. Further, for each of the least one cluster, the maturity analysis module 206 assigns a rank to each of the set of requirements based on a set of performance parameters of each of the set of requirements. By way of an example, the set of performance parameters may include, but may not be limited to, performance, code quality, error handling, defect localization in production environment, technology weightage, and the like. Further, for each of the least one cluster, the maturity analysis module 206 selects a top-ranked requirement from the set of requirements.

The delta analysis module 208 receives the top-ranked requirement from the maturity analysis module 206. For each of the at least one cluster, the delta analysis module 208 compares the top-ranked requirement with remaining of the set of requirements. Further, for each of the at least one cluster, the delta analysis module 208 identifies one or more unique elements from the remaining of the at least two of the plurality of requirements which are absent in the top-ranked requirement. Further, for each of the at least one cluster, the delta analysis module 208 either creates a new requirement based on each of the one or more unique elements, or adds the one or more unique elements to the top-ranked requirement. Further, the delta analysis module 208 generates a common application as an output 212. The common application includes common requirements identified from the plurality of applications.

It should be noted that all such aforementioned modules 202-208 may be represented as a single module or a combination of different modules. Further, as will be appreciated by those skilled in the art, each of the modules 202-208 may reside, in whole or in parts, on one device or multiple devices in communication with each other. In some embodiments, each of the modules 202-208 may be implemented as dedicated hardware circuit comprising custom application-specific integrated circuit (ASIC) or gate arrays, off-the-shelf semiconductors such as logic chips, transistors, or other discrete components. Each of the modules 202-208 may also be implemented in a programmable hardware device such as a field programmable gate array (FPGA), programmable array logic, programmable logic device, and so forth. Alternatively, each of the modules 202-208 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying common requirements from applications. For example, the exemplary system 100 and the associated requirements identification device 102 may identify common requirements from applications by the processes discussed herein. In particular, as will be appreciated by those of ordinary skill in the art, control logic and/or automated routines for performing the techniques and steps described herein may be implemented by the system 100 and the associated requirements identification device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3A:
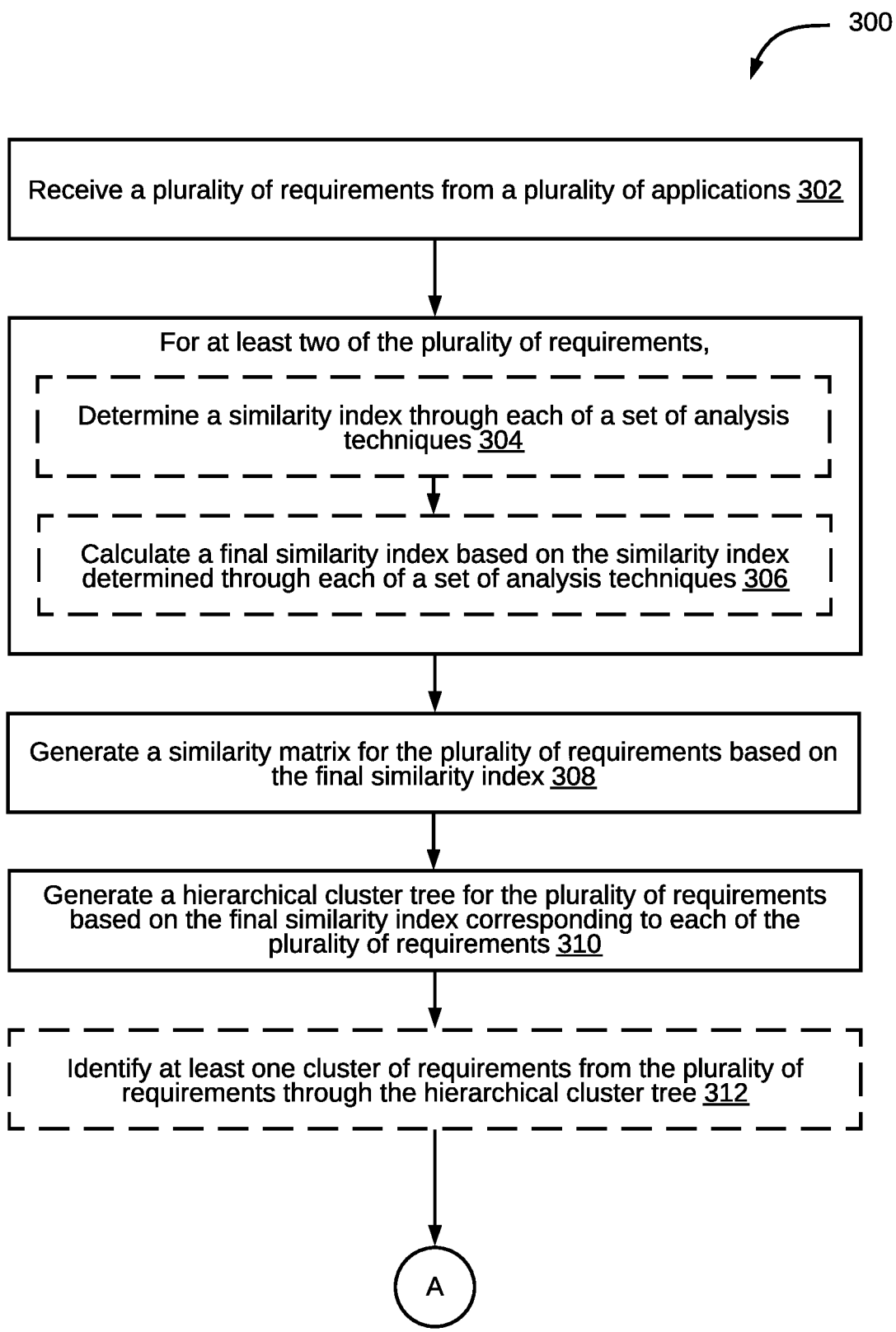
FIGS. 3A and 3B illustrate a flow diagram of an exemplary process for identifying common requirements from applications, in accordance with some embodiments.
Figure 3B:
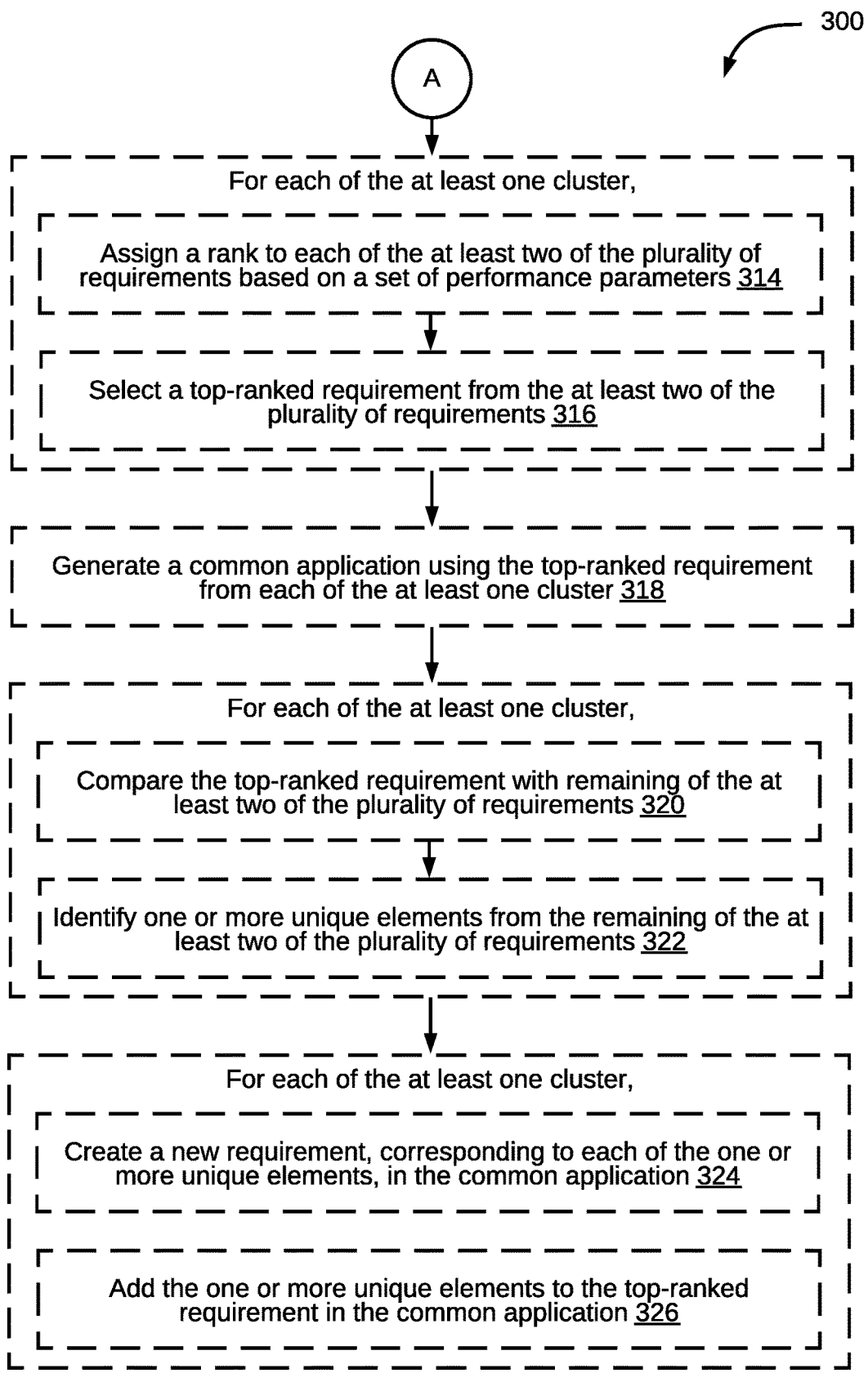

Referring now to FIGS. 3A and 3B, an exemplary process 300 for identifying common requirements from applications is depicted via a flowchart, in accordance with some embodiments. The process 300 may be implemented by the requirements identification device 102 of the system 100. The process 300 includes receiving a plurality of requirements from a plurality of applications, at step 302. It should be noted that each of the plurality of requirements corresponds to a functionality in one of the plurality of applications. In some embodiments, the plurality of requirements is identified from each of the plurality of applications through a code analysis technique.

Further, the process 300 includes, for at least two of the plurality of requirements, determining a similarity index through each of a set of analysis techniques, at step 304. In an embodiment, the set of analysis techniques includes a process driven analysis technique, a data driven analysis technique, and a consumer driven analysis technique. It may be noted that elements of each of the at least two of the plurality of requirements may be transformed into technology agnostic elements prior to determining the similarity index through each of the set of analysis techniques.

Further, the process 300 includes, for at least two of the plurality of requirements, calculating a final similarity index based on the similarity index determined through each of a set of analysis techniques, at step 306. In an embodiment, the final similarity index is a weighted average of the similarity index determined through each of a set of analysis techniques. Further, the process 300 includes generating a similarity matrix for the plurality of requirements based on the final similarity index, at step 308. Elements of the similarity matrix are final similarity indices corresponding to the plurality of requirements. By way of an example, the comparison module 202 may receive the plurality of applications and identify the plurality of requirements in each of the plurality of applications through a code analysis technique. Further, the comparison module 202 may determine a similarity index for at least two of the plurality of requirements through each of a process-driven comparison, a data-driven comparison, and a consumer-driven comparison. A weighted average of three similarity indices obtained through the set of analysis techniques may be used to obtain a final similarity index. A similarity matrix may be obtained including the final similarity indices corresponding to the plurality of requirements.

Further, the process 300 includes generating a hierarchical cluster tree for the plurality of requirements based on the final similarity index corresponding to each of the plurality of requirements, at step 310. Further, the process 300 includes identifying at least one cluster of requirements from the plurality of requirements through the hierarchical cluster tree, at step 312. It may be noted that the at least one cluster of requirements includes each of the at least two of the plurality of requirements. It may also be noted that the final similarity index corresponding to the at least two of the plurality of requirements within the at least one cluster is above a predefined threshold. In continuation of the example above, the cluster tree generation module 204 may receive the similarity matrix from the comparison module 202 and generate a hierarchical cluster tree based on the similarity matrix. Further, the plurality of requirements may be divided into clusters using the hierarchical cluster tree. It may be noted that for requirements within each cluster, the final similarity index is above a predefined threshold.

Further, the process 300 includes, for each of the at least one cluster, assigning a rank to each of the at least two of the plurality of requirements based on a set of performance parameters, at step 314. Further, the process 300 includes for each of the at least one cluster, selecting a top-ranked requirement from the at least two of the plurality of requirements, at step 316. Further, the process 300 includes generating a common application using the top-ranked requirement from each of the at least one cluster, at step 318. In continuation of the example above, the maturity analysis module 206 may receive the clusters from the cluster tree generation module 204 and assign a rank to each of the requirements within the cluster based on a set of performance parameters of each of the requirements within the cluster. It may be noted that the requirements within a cluster are considered as common requirements by the system 200. Therefore, a top-ranked requirement from each of the clusters may be selected to generate a common application (for example, a common monolith application from a plurality of applications).

Further, the process 300 includes, for each of the at least one cluster, comparing the top-ranked requirement with remaining of the at least two of the plurality of requirements, at step 320. Further, the process 300 includes, for each of the at least one cluster, identifying one or more unique elements from the remaining of the at least two of the plurality of requirements, at step 322. The one or more unique elements are absent in the top-ranked requirement. Further, the process 300 includes, for each of the at least one cluster, creating a new requirement, corresponding to each of the one or more unique elements, in the common application, at step 324. Further, the process 300 includes, for each of the at least one cluster, adding the one or more unique elements to the top-ranked requirement in the common application, at step 326. In continuation of the example above, the delta analysis module 208 receives the top-ranked requirement selected by the maturity analysis module 206. Further, the delta analysis module 206 performs a comparison between process elements of the top-ranked requirement with process elements of remaining of the requirements within the cluster. When unique process elements are found in the remaining of the requirements which may be essential for the common application, such unique process elements are either added to the top-ranked requirement in the common application or added as a new requirement to the common application. It may be noted that an optimized set of requirements is obtained in form of the common application.

Figure 4A:
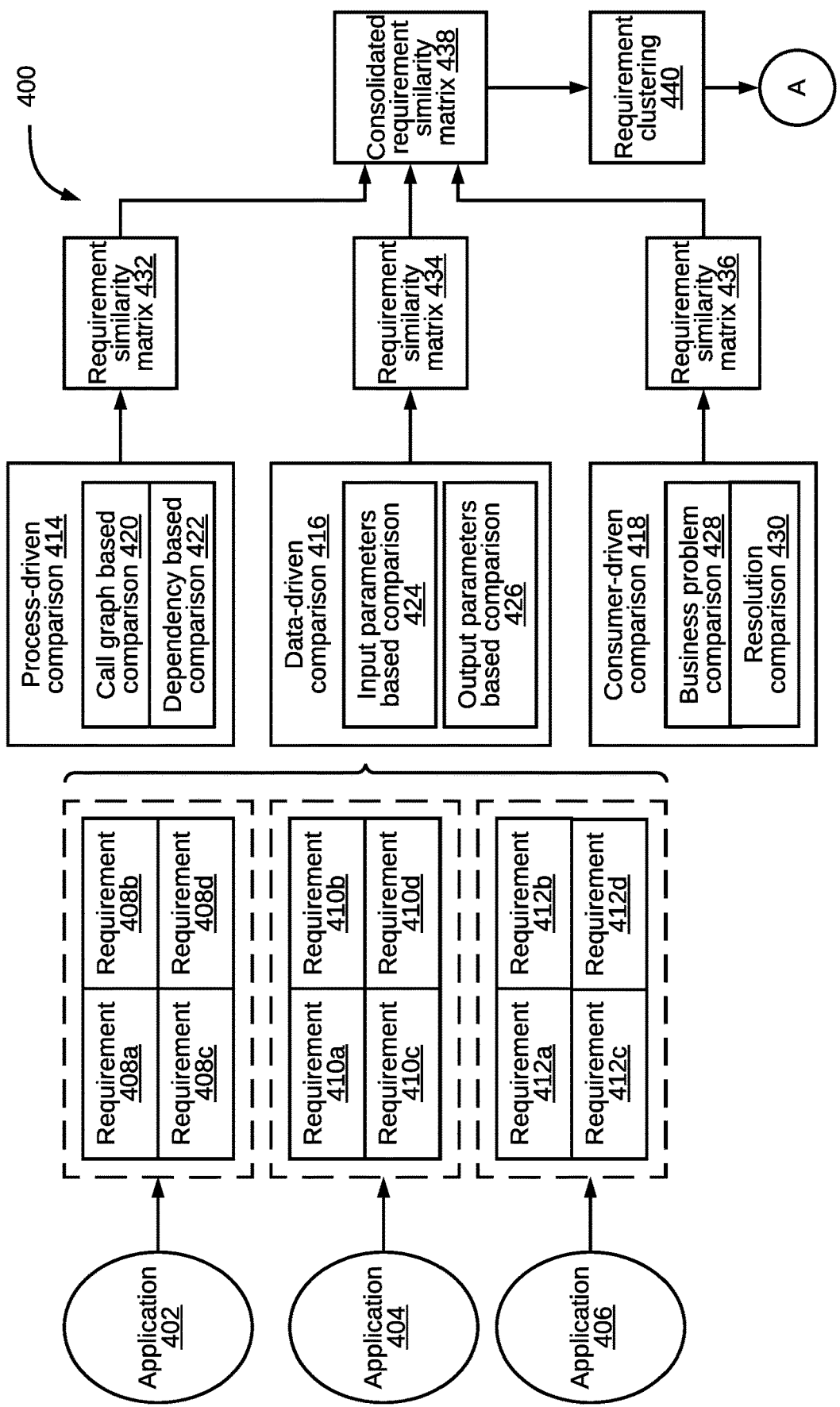

Referring now to FIGS. 4A and 4B, a detailed exemplary control logic 400 for identifying common requirements from applications is depicted via a flow chart, in accordance with some embodiments. In an embodiment, the control logic 400 may be implemented through the requirements identification device 102. By way of an example, the control logic 400 includes a plurality of applications (for example, an application 402, an application 404, and an application 406). It may be noted that the application 402, the application 404, and the application 406 are shown as an exemplary scenario for the control logic 400 and that in some other embodiments, the plurality of applications may include more than three applications.

Further, each of the plurality of applications includes a plurality of requirements. By way of an example, the application 402 includes requirements 408a, 408b, 408c, and 408d, the application 404 includes requirements 410a, 410b, 410c, and 410d, and the application 406 includes requirements 412a, 412b, 412c, and 412d. The control logic 400 includes identifying the plurality of requirements from each of the plurality of applications. Technology-specific static and dynamic code analysis may be used to identify the plurality of requirements of an application. Further, the control logic 400 includes comparing each of the plurality of requirements with remaining of the plurality of requirements through a set of analysis techniques. The set of analysis techniques includes process-driven comparison 414, data-driven comparison 416, and consumer-driven comparison 418. A similarity index may be determined between each of the plurality of requirements with remaining of the plurality of requirements through each of the set of analysis techniques. Three similarity indices may be obtained upon performing process-driven comparison 414, data-driven comparison 416, and consumer-driven comparison 418. The similarity index between two requirements (for example, the requirement 412a and the requirement 414a) indicates a level of commonality between the two requirements. In an embodiment, the similarity index may range from 0 to 100. In such an embodiment, the similarity index of 0 may indicate no similarity between the two requirements and the similarity index of 100 may indicate complete similarity between the two requirements.

The process driven comparison 414 may be performed for two requirements to identify a process flow associated with a requirement and to compare the process flow of the requirement with the process flow of another requirement to determine a similarity level between the two requirements. Further, the process driven comparison 414 may include a call graph-based comparison 420, a dependency-based comparison 422, or a combination thereof. The call graph-based comparison 420 is explained in detail in conjunction with FIGS. 5 and 6.

Figure 5:
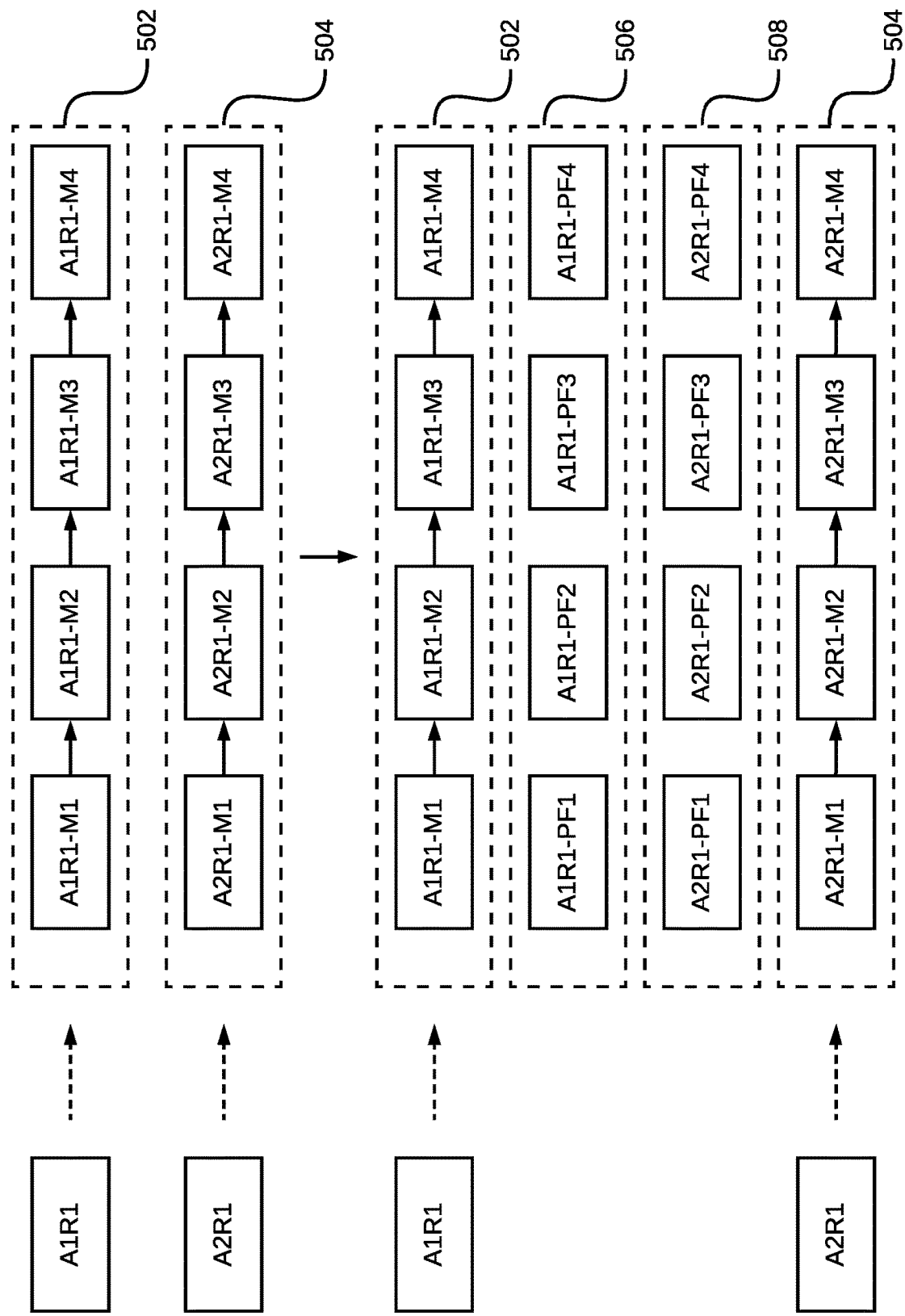
FIG. 5 illustrates transformation of technology-specific elements of requirements into technology-agnostic process elements through call graph analysis, in accordance with some embodiments.

Referring now to FIG. 5, transformation of technology-specific elements of requirements (for example, A1R1 and A2R1) into technology-agnostic process elements through call graph analysis is illustrated, in accordance with some embodiments. The comparison module 202 generates a technology-specific method flow for each of the plurality of requirements. A technology-specific method flow 502 is obtained for the requirement A1R1 and a technology-specific method flow 504 is obtained for the requirement A2R1 through call graph data. By way of an example, the technology-specific method flow 502 includes steps A1R1-M1, A1R1-M2, A1R1-M3, and A1R1-M4 and the technology-specific method flow 504 includes steps A2R1-M1, A2R1-M2, A2R1-M3, and A2R1-M4. It may be noted that the technology-specific method flow of a requirement is based on a technology of an application to which the requirement belongs. Therefore, the steps in the technology-specific method flows of different requirements may be based on different technologies. However, to obtain a similarity index between two requirements, the technology of each of the two requirements should be same.

The comparison module 202 may transform the steps of the technology-specific method flow for each of the plurality of requirements into technology-agnostic elements. Thus, the technology-specific method flow for each of the plurality of requirements is transformed into a technology-agnostic process flow or a pseudocode. The technology-specific method flow 502 is transformed into technology-agnostic process flow 506 and the technology-specific method flow 504 is transformed into technology-agnostic process flow 508. Technology-agnostic elements of the technology-agnostic process flow 506 include A1R1-PF1, A1R1-PF2, A1R1-PF3, and A1R1-PF4. Technology-agnostic elements of the technology-agnostic process flow 506 include A2R1-PF1, A2R1-PF2, A2R1-PF3, and A2R1-PF4. It may be noted that the technology-agnostic process flow obtained through a call graph may be in form of a sequence diagram, a flowchart diagram, a pseudocode, or the like.

Figures 6, 7:
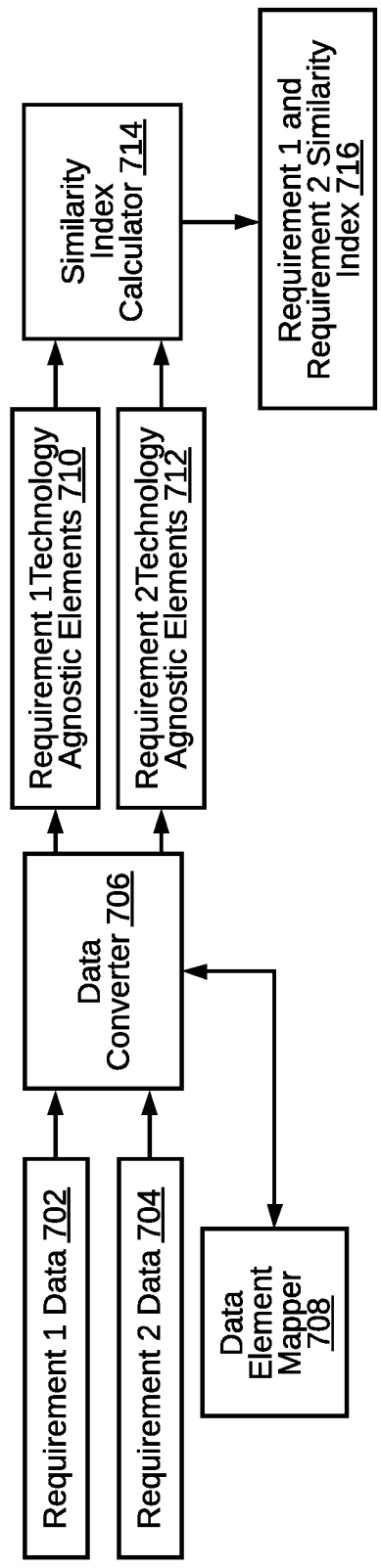
FIG. 6 is an exemplary table describing calculation of a similarity index between two requirements based on call graph-based comparison, in accordance with some embodiments.
FIG. 7 illustrates data-driven comparison between two requirements, in accordance with some embodiments.

Referring now to FIG. 6, an exemplary table 600 describing calculation of a similarity index between two requirements (for example, A1R1 and A2R1) based on call graph-based comparison is shown, in accordance with some embodiments. The table 600 aligns the steps of the technology-agnostic process flows of the requirements A1R1 and A2R1. Further, a weightage 602 is assigned to each of the steps of the technology-agnostic process flows based on importance of each of the steps. For example, the weightage 602 corresponding to the steps A1R1-PF1 and A2R1-PF1 is 20%. Further, the steps may be compared to obtain a process level similarity index 604. The process level similarity index 604 corresponding to the steps A1R1-PF1 and A2R1-PF1 is 80.

Further, effective similarity index 606 at a process level is calculated by multiplying the process level similarity index 604 and the weightage 602. The effective similarity index 606 corresponding to the steps A1R1-PF1 and A2R1-PF1 is 16. Similarly, the effective similarity index 606 may be obtained for each of the steps of the technology-agnostic process flows of the requirements A1R1 and A2R1. A requirement level similarity index 608 based on the call graph-based comparison is calculated as a sum of the effective similarity index 606 corresponding to each of the steps of the technology-agnostic process flows of the requirements A1R1 and A2R1. The requirement level similarity index 608 of the requirements A1R1 and A2R1 is 46.8.

Referring back to FIGS. 4A and 4B, the dependency based comparison 422 performs a comparison between list of external dependencies used for each of the plurality of requirements. An element of a requirement may use an external dependency through libraries or third-party web services. Evaluation of number of library calls and type of library calls may be used for identifying similarities between requirements. Further, applications may use third-party web services over the internet and analysis of common third-party web services across applications may be used to identify the similarities between requirements. It may be noted that the similarity index between two requirements with respect to process-driven comparison 414 may be calculated by applying the similarity index calculated based on the call graph based comparison 420 and the dependency based comparison 422 using an appropriate weightage.

Further, the data-driven comparison 416 may include input parameters based comparison 424 and output parameters based comparison 426. The data-driven comparison 416 may compare the plurality of requirements based on data elements consumed and processed by each of the plurality of requirements. It may be noted that internal processing element may be similar to a black box. By way of an example, data inflow to a requirement may be through method argument, configurations, query result from a database, etc. It may also be noted that data outflow for a requirement may be through return value of a function, report generated in a file system, updating data in a database, etc. A similarity index based on the data-driven comparison 416 may be determined. This is further discussed in detail in conjunction with FIG. 7.

Referring now to FIG. 7, data-driven comparison between two requirements (for example, requirement 1 and requirement 2) is illustrated, in accordance with some embodiments. It may be noted that requirement 1 data 702 and requirement 2 data 704 may be technology-specific and based on the technology of the application. In some exemplary scenarios, data representation and formation in at least one requirement may be provided in a non-standardized manner. In such scenarios, direct data comparison may give erroneous results. Therefore, data converter 706 receives the requirement 1 data 702 and the requirement 2 data 704. Further, the data converter 706 uses a data element mapper 708 to transform data elements of each of the requirement 1 data 702 and the requirement 2 data 704 into requirement 1 technology agnostic elements 710 and requirement 2 technology agnostic elements 712, respectively. In some embodiments, the data element mapper 708 may include technology specific data types. Further, the requirement 1 technology agnostic elements 710 and the requirement 2 technology agnostic elements 712 may be provided to a similarity index calculator 714 to determine a requirement 1 and requirement 2 similarity index 716.

Referring back to FIGS. 4A and 4B, consumer-driven comparison 418 is performed between the plurality of requirements. The consumer-driven comparison 418 evaluates a requirement based on a business problem resolved by the requirement from point of view of a consumer. The consumer-driven comparison 418 may include a business problem comparison 428 and a resolution comparison 430. It may be noted that the process-driven comparison 414, the data-driven comparison 416, and the consumer-driven comparison 418 may be performed sequentially or in parallel. This is discussed in detail in conjunction with FIG. 8.

Referring now to FIG. 8, consumer-driven comparison between two requirements (for example, requirement 1 and requirement 2) is illustrated, in accordance with some embodiments. The consumer-driven comparison includes a business problem comparison 802 and a resolution comparison 804. The business problem comparison 802 includes receiving a requirement 1 business problem 806 and a requirement 2 business problem 808. Further, a similarity index based on business problem 810 is calculated based on the requirement 1 business problem 806 and the requirement 2 business problem 808. The resolution comparison 804 includes receiving a requirement 1 resolution 812 and a requirement 2 resolution 814. Further, a similarity index based on resolution 816 is calculated based on the requirement 1 resolution 812 and the requirement 2 resolution 814.

Referring now to FIGS. 4A and 4B, the control logic 400 includes calculating a similarity index between two requirements through each of the process-driven comparison 414, the data-driven comparison 416, and the consumer-driven comparison 418. A similarity matrix is generated for the plurality of requirements through each of the process-driven comparison 414, the data-driven comparison 416, and the consumer-driven comparison 418. The process-driven comparison 414 generates a requirement similarity matrix 432, the data-driven comparison 416 generates a requirement similarity matrix 434, and the consumer-driven comparison 418 generates a requirement similarity matrix 436. Further, a final similarity index is calculated between two requirements based on the similarity matrix calculated through each of the process-driven comparison 414, the data-driven comparison 416, and the consumer-driven comparison 418. In some embodiments, the final similarity index for two requirements may be a weighted average of the similarity indices for the two requirements calculated through the process-driven comparison 414, the data-driven comparison 416, and the consumer-driven comparison 418. A consolidated similarity matrix 438 is constructed for the plurality of requirements using each of the requirement similarity matrix 432, the requirement similarity matrix 434, and the requirement similarity matrix 436. This is discussed in detail in conjunction with FIG. 9.

Referring now to FIG. 9, an exemplary similarity matrix 900 for a plurality of requirements (for example, A1R1, A1R2, A2R1, A2R2, and A2R3) is depicted, in accordance with some embodiments. The similarity matrix 900 may be analogous to the consolidated similarity matrix 438. Each of elements of the similarity matrix 900 may be a final similarity index for two requirements. For example, the final similarity index between A1R1 and A1R2 is 0.45 and the final similarity index between A1R1 and A2R1 is 0.74. In some embodiments, the final similarity index for two requirements may be a weighted average of the similarity indices for the two requirements calculated through the process-driven comparison 414, the data-driven comparison 416, and the consumer-driven comparison 418.

Referring now to FIGS. 4A and 4B, the control logic 400 further includes requirement clustering 440. The plurality of requirements is grouped into a plurality of clusters through a hierarchical cluster tree. For example, the plurality of clusters may include a cluster 442a, a cluster 442b, and a cluster 442c. This has been discussed in detail in conjunction with FIG. 10.

Figures 10, 11:
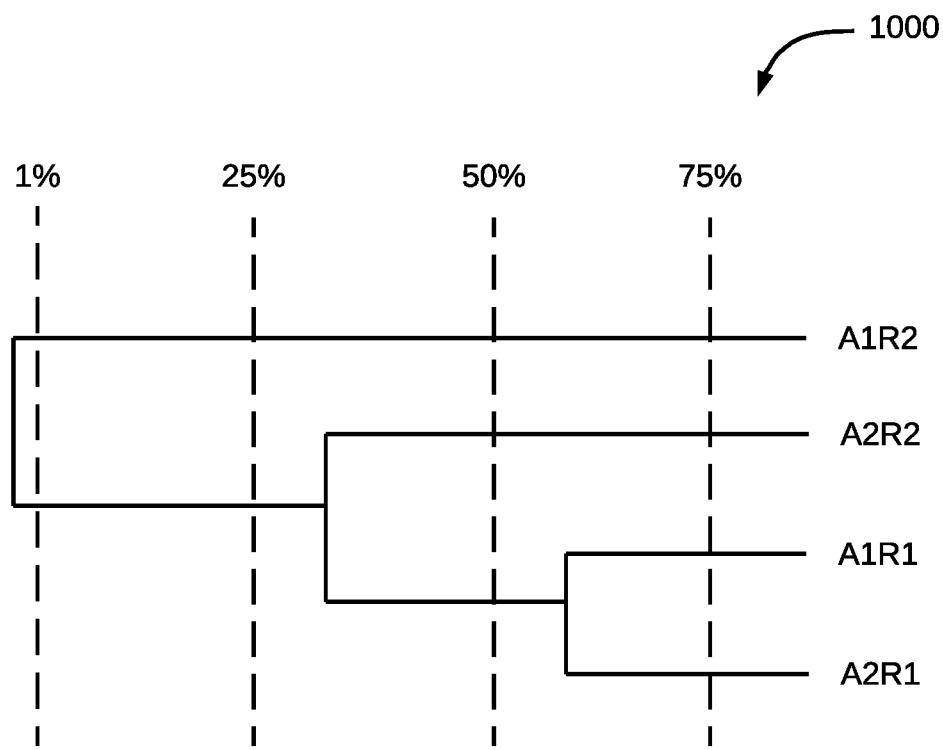
FIG. 10 illustrates a hierarchical cluster tree for a plurality of requirements, in accordance with some embodiments.
FIG. 11 is an exemplary table describing maturity analysis between two common requirements, in accordance with some embodiments.

Referring now to FIG. 10, a hierarchical cluster tree 1000 for a plurality of requirements (for example, A1R2, A2R2, A1R1, and A2R1) is illustrated, in accordance with some embodiments. The hierarchical cluster tree 1000 is generated based on a similarity matrix (for example, the similarity matrix 900) corresponding to the plurality of requirements. It may be noted that two requirements may be grouped into a cluster when the final similarity index between the two requirements is above a predefined threshold similarity. Therefore, when the predefined threshold similarity is 75%, A1R1 and A2R1 are grouped into one cluster. The hierarchical cluster tree may be summarized as: "(A1R1, A2R1), A2R2, A1R2". The predefined threshold similarity may be defined based on business requirements. The requirements A1R1 and A2R1 are above the predefined threshold similarity. Therefore, A1R1 and A2R1 are considered as common requirements. It may be noted that one of A1R1 and A2R1 may be included in an optimal set of requirements for the common application.

Referring now to FIGS. 4A and 4B, the control logic 400 may further include maturity analysis 444. In an embodiment, the maturity analysis 444 may be performed by the maturity analysis module 206. A cluster obtained from the hierarchical cluster tree may include a set of requirements. The maturity analysis 444 may determines an optimum requirement from the set of requirements based on a set of performance parameters. This is discussed in detail in conjunction with FIG. 11.

Referring now to FIG. 11, an exemplary table 1100 describing maturity analysis between two common requirements (for example, A1R1 and A2R1) is illustrated, in accordance with some embodiments. The maturity analysis includes assigning a rank to each of a set of requirements within a cluster. Further, a top-ranked requirement from the set of requirements is selected in a list of final requirements in the common application. The table 1100 allows evaluation of each of the set of requirements within a cluster based on a set of performance parameters such as performance 1102, code quality 1104, error handling 1106, usage in production 1108, and technology weightage 1110. Further, a sum of each of the set of performance parameters is calculated as total 1112. Further, a rank 1114 is assigned to each of the set of requirements based on the total 1112. For example, when the total 1112 corresponding to A1R1 and A2R1 are 30 and 21, respectively, the ranks 1114 associated with A1R1 and A2R1 are 1 and 2, respectively. Therefore, A1R1 may be selected within the optimal set of requirements in the common application.

Referring now to FIGS. 4A and 4B, the control logic 400 may further include delta analysis 446. Delta analysis 446 compares the top-ranked requirement from a set of requirements (for example, A1R1) with remaining of the set of requirements (such as, A2R1) to identify missing features in the top-ranked requirement which may be essential in the common application. For example, when A1R1 is an accepted requirement and A2R1 is a rejected requirement, the delta analysis 446 may be performed between A1R1 and A2R1 to identify unique process elements of A2R1. Process elements of each of the set of requirements may be obtained through call graph comparison. For example, A1R1 may include the process elements PE1, PE2, PE3, and PE5. Further, A2R1 may include the process elements PE1, PE2, PE4, and PE6. Therefore, the delta analysis 446 between A1R1 and A2R1 may be represented as:

$$D(A1R1,A2R1)=PE4,PE6 \qquad (1)$$

Therefore, PE4 and PE6 may be identified as unique elements through the delta analysis 446. Further, based on the nature of each of PE4 and PE6, the delta analysis module 208 may decide whether to create a new requirement corresponding to PE4 and PE6 in the common application or to add PE4 and PE6 to the top-ranked requirement in the optimal set of requirements 448.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 12:
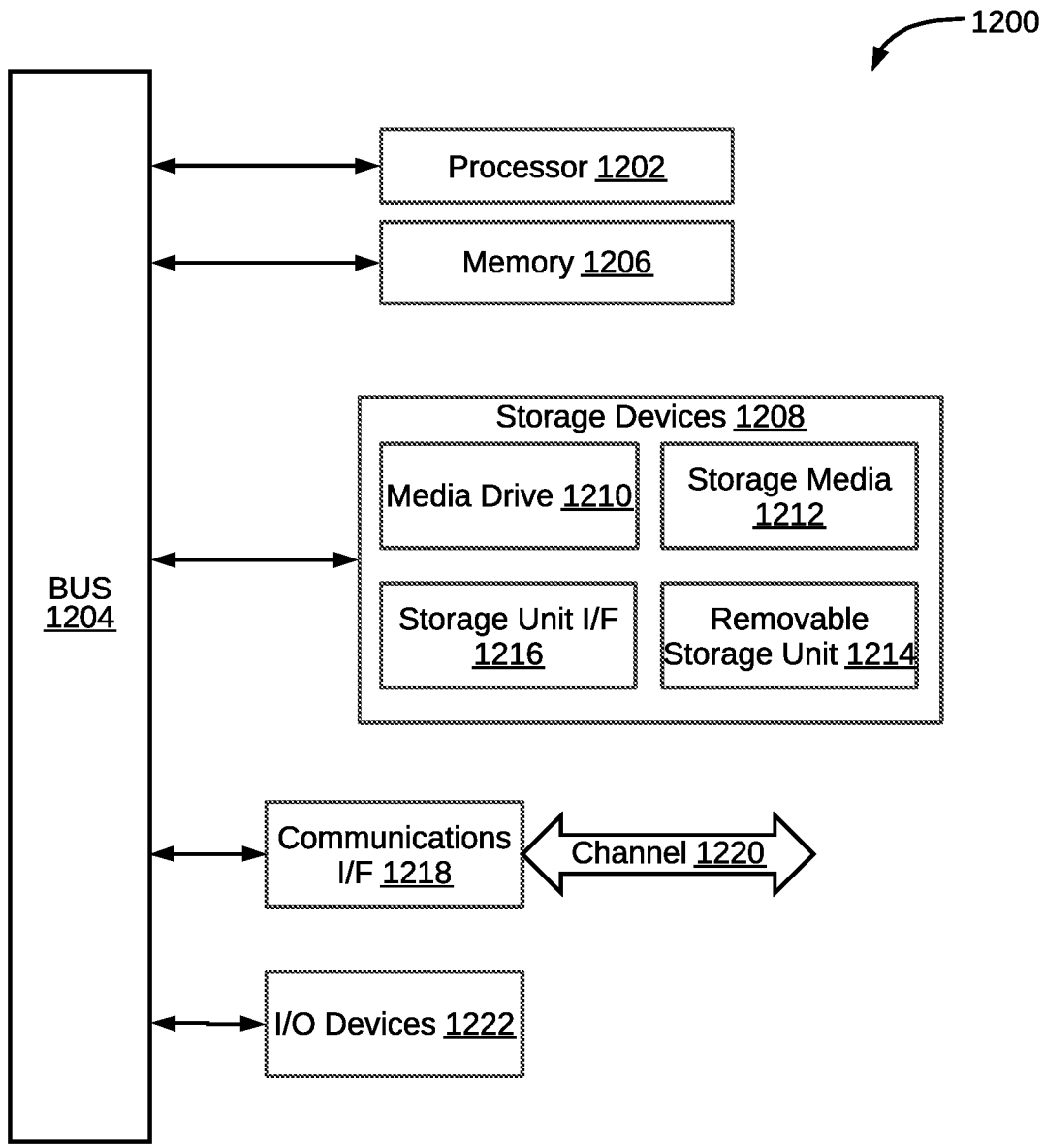
FIG. 12 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 12, an exemplary computing system 1200 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1200 may represent, for example, a user device such as a desktop, a laptop, a mobile phone, personal entertainment device, DVR, and so on, or any other type of special or general-purpose computing device as may be desirable or appropriate for a given application or environment. The computing system 1200 may include one or more processors, such as a processor 1202 that may be implemented using a general or special purpose processing engine such as, for example, a microprocessor, microcontroller or other control logic. In this example, the processor 1202 is connected to a bus 1204 or other communication medium. In some embodiments, the processor 1202 may be an Artificial Intelligence (AI) processor, which may be implemented as a Tensor Processing Unit (TPU), or a graphical processor unit, or a custom programmable solution Field-Programmable Gate Array (FPGA).

The computing system 1200 may also include a memory 1206 (main memory), for example, Random Access Memory (RAM) or other dynamic memory, for storing information and instructions to be executed by the processor 1202. The memory 1206 also may be used for storing temporary variables or other intermediate information during execution of instructions to be executed by the processor 1202. The computing system 1200 may likewise include a read only memory ("ROM") or other static storage device coupled to bus 1204 for storing static information and instructions for the processor 1202.

The computing system 1200 may also include a storage devices 1208, which may include, for example, a media drive 1210 and a removable storage interface. The media drive 1210 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 1212 may include, for example, a hard disk, magnetic tape, flash drive, or other fixed or removable medium that is read by and written to by the media drive 1210. As these examples illustrate, the storage media 1212 may include a computer-readable storage medium having stored therein particular computer software or data.

In alternative embodiments, the storage devices 1208 may include other similar instrumentalities for allowing computer programs or other instructions or data to be loaded into the computing system 1200. Such instrumentalities may include, for example, a removable storage unit 1214 and a storage unit interface 1216, such as a program cartridge and cartridge interface, a removable memory (for example, a flash memory or other removable memory module) and memory slot, and other removable storage units and interfaces that allow software and data to be transferred from the removable storage unit 1214 to the computing system 1200.

The computing system 1200 may also include a communications interface 1218. The communications interface 1218 may be used to allow software and data to be transferred between the computing system 1200 and external devices. Examples of the communications interface 1218 may include a network interface (such as an Ethernet or other NIC card), a communications port (such as for example, a USB port, a micro USB port), Near field Communication (NFC), etc. Software and data transferred via the communications interface 1218 are in the form of signals which may be electronic, electromagnetic, optical, or other signals capable of being received by the communications interface 1218. These signals are provided to the communications interface 1218 via a channel 1220. The channel 1220 may carry signals and may be implemented using a wireless medium, wire or cable, fiber optics, or other communications medium. Some examples of the channel 1220 may include a phone line, a cellular phone link, an RF link, a Bluetooth link, a network interface, a local or wide area network, and other communications channels.

The computing system 1200 may further include Input/Output (I/O) devices 1222. Examples may include, but are not limited to a display, keypad, microphone, audio speakers, vibrating motor, LED lights, etc. The I/O devices 1222 may receive input from a user and also display an output of the computation performed by the processor 1202. In this document, the terms "computer program product" and "computer-readable medium" may be used generally to refer to media such as, for example, the memory 1206, the storage devices 1208, the removable storage unit 1214, or signal(s) on the channel 1220. These and other forms of computer-readable media may be involved in providing one or more sequences of one or more instructions to the processor 1202 for execution. Such instructions, generally referred to as "computer program code" (which may be grouped in the form of computer programs or other groupings), when executed, enable the computing system 1200 to perform features or functions of embodiments of the present invention.

In an embodiment where the elements are implemented using software, the software may be stored in a computer-readable medium and loaded into the computing system 1200 using, for example, the removable storage unit 1214, the media drive 1210 or the communications interface 1218. The control logic (in this example, software instructions or computer program code), when executed by the processor 1202, causes the processor 1202 to perform the functions of the invention as described herein.

Thus, the disclosed method and system try to overcome the technical problem of identifying common requirements from applications. The method and system provide a significant reduction in application portfolio optimization assessment. Further, the method and system provide for cost and effort optimization in identifying commonalities and uniqueness across heterogeneous monolith applications. Further, the method and system accelerate time to market by generating intelligent insights and help in making informed decisions on transformation roadmap.

As will be appreciated by those skilled in the art, the techniques described in the various embodiments discussed above are not routine, or conventional, or well understood in the art. The techniques discussed above provide for identifying common requirements from applications. The techniques first receive a plurality of requirements from a plurality of applications. Each of the plurality of requirements corresponds to a functionality in one of the plurality of applications. For at least two of the plurality of requirements, the techniques may then determine a similarity index through each of a set of analysis techniques. The set of analysis techniques includes a process driven analysis technique, a data driven analysis technique, and a consumer driven analysis technique. For at least two of the plurality of requirements, the techniques may then calculate a final similarity index based on the similarity index determined through each of a set of analysis techniques. The final similarity index is a weighted average of the similarity index determined through each of a set of analysis techniques. The techniques may then generate a similarity matrix for the plurality of requirements based on the final similarity index. Elements of the similarity matrix are final similarity indices corresponding to the plurality of requirements. The techniques may then generate a hierarchical cluster tree for the plurality of requirements based on the final similarity index corresponding to each of the plurality of requirements.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for identifying common requirements from applications. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying common requirements from applications, the method comprising:

receiving, by a requirements identification device, a plurality of requirements from a plurality of applications, wherein each of the plurality of requirements corresponds to a functionality in one of the plurality of applications, and wherein the plurality of requirements are identified from the plurality of applications through a code analysis technique;

for at least two of the plurality of requirements, determining, by the requirements identification device, a similarity index through each of a set of analysis techniques, wherein the set of analysis techniques comprises a process driven analysis technique, a data driven analysis technique, and a consumer driven analysis technique;

calculating, by the requirements identification device, a final similarity index based on the similarity index determined through each of a set of analysis techniques, wherein the final similarity index is a weighted average of the similarity index determined through each of a set of analysis techniques;

generating, by the requirements identification device, a similarity matrix for the plurality of requirements based on the final similarity index, wherein elements of the similarity matrix are final similarity indices corresponding to the plurality of requirements; and generating, by the requirements identification device, a hierarchical cluster tree for the plurality of requirements based on the final similarity index corresponding to each of the plurality of requirements; and identifying at least one cluster of requirements from the plurality of requirements through the hierarchical cluster tree, wherein the at least one cluster of requirements comprises each of the at least two of the plurality of requirements, wherein for each of the at least one cluster, comparing a top-ranked requirement with remaining of at least two of the plurality of requirements; and
identifying one or more unique elements from the remaining of the at least two of the plurality of requirements, wherein the one or more unique elements are absent in the top-ranked requirement;
identifying the plurality of requirements from each of the plurality of applications through a code analysis technique.

2. The method of claim 1, wherein the final similarity index corresponding to the at least two of the plurality of requirements within the at least one cluster is above a predefined threshold.

3. The method of claim 2, further comprising:
for each of the at least one cluster,
assigning a rank to each of the at least two of the plurality of requirements based on a set of performance parameters; and
selecting the top-ranked requirement from the at least two of the plurality of requirements.

4. The method of claim 3, further comprising generating a common application using the top-ranked requirement from each of the at least one cluster.

5. The method of claim 4, further comprising, one of:
for each of the at least one cluster,
creating a new requirement, corresponding to each of the one or more unique elements, in the common application; or
adding the one or more unique elements to the top-ranked requirement in the common application.

6. The method of claim 1, further comprising transforming elements of each of the at least two of the plurality of requirements into technology agnostic elements prior to determining the similarity index through each of the set of analysis techniques.

7. A system for identifying common requirements from applications, the system comprising a processor; and
a memory communicatively coupled to the processor, wherein the memory stores processor instructions, which when executed by the processor, cause the processor to:
receive a plurality of requirements from a plurality of applications, wherein each of the plurality of requirements corresponds to a functionality in one of the plurality of applications;
for at least two of the plurality of requirements, determine a similarity index through each of a set of analysis techniques,
wherein the set of analysis techniques comprises a process driven analysis technique, a data driven analysis technique, and a consumer driven analysis technique;
calculate a final similarity index based on the similarity index determined through each of a set of analysis techniques, wherein the final similarity index is a weighted average of the similarity index determined through each of a set of analysis techniques;
generate a similarity matrix for the plurality of requirements based on the final similarity index, wherein elements of the similarity matrix are final similarity indices corresponding to the plurality of requirements; and
generate a hierarchical cluster tree for the plurality of requirements based on the final similarity index corresponding to each of the plurality of requirements; and
identify at least one cluster of requirements from the plurality of requirements through the hierarchical cluster tree, wherein the at least one cluster of requirements comprises each of the at least two of the plurality of requirements, wherein for each of the at least one cluster, comparing a top-ranked requirement with remaining of at least two of the plurality of requirements; and identifying one or more unique elements from the remaining of the at least two of the plurality of requirements, wherein the one or more unique elements are absent in the top-ranked requirement;
wherein the processor instructions, on execution, further cause the processor to identify the plurality of requirements from each of the plurality of applications through a code analysis technique.

8. The system of claim 7, wherein the final similarity index corresponding to the at least two of the plurality of requirements within the at least one cluster is above a predefined threshold.

9. The system of claim 8, wherein the processor instructions, on execution, further cause the processor to:
for each of the at least one cluster,
assign a rank to each of the at least two of the plurality of requirements based on a set of performance parameters; and
select the top-ranked requirement from the at least two of the plurality of requirements.

10. The system of claim 9, wherein the processor instructions, on execution, further cause the processor to generate a common application using the top-ranked requirement from each of the at least one cluster.

11. The system of claim 10, wherein the processor instructions, on execution, further cause the processor to, one of:
for each of the at least one cluster,
create a new requirement, corresponding to each of the one or more unique elements, in the common application; or
add the one or more unique elements to the top-ranked requirement in the common application.

12. The system of claim 7, wherein the processor instructions, on execution, further cause the processor to transform elements of each of the at least two of the plurality of requirements into technology agnostic elements prior to determining the similarity index through each of the set of analysis techniques.

13. A non-transitory computer-readable medium storing computer-executable instructions for identifying common requirements from applications, the computer-executable instructions configured for:
receiving a plurality of requirements from a plurality of applications, wherein each of the plurality of requirements corresponds to a functionality in one of the plurality of applications;
for at least two of the plurality of requirements, determining a similarity index through each of a set of analysis techniques,
wherein the set of analysis techniques comprises a process driven analysis technique, a data driven analysis technique, and a consumer driven analysis technique;
calculating a final similarity index based on the similarity index determined through each of a set of analysis techniques, wherein the final similarity index is a weighted average of the similarity index determined through each of a set of analysis techniques;
generating a similarity matrix for the plurality of requirements based on the final similarity index,
wherein elements of the similarity matrix are final similarity indices corresponding to the plurality of requirements; and generating a hierarchical cluster tree for the plurality of requirements based on the final similarity index corresponding to each of the plurality of requirements; and identifying at least one cluster of requirements from the plurality of requirements through the hierarchical cluster tree, wherein the at least one cluster of requirements comprises each of the at least two of the plurality of requirements, wherein for each of the at least one cluster, comparing a top-ranked requirement with remaining of at least two of the plurality of requirements; and identifying one or more unique elements from the remaining of the at least two of the plurality of requirements, wherein the one or more unique elements are absent in the top-ranked requirement;

identifying the plurality of requirements from each of the plurality of applications through a code analysis technique.

14. The non-transitory computer-readable medium of claim 13, wherein the final similarity index corresponding to the at least two of the plurality of requirements within the at least one cluster is above a predefined threshold.

15. The non-transitory computer-readable medium of claim 14, wherein the computer-executable instructions are further configured for:
   for each of the at least one cluster,
      assigning a rank to each of the at least two of the plurality of requirements based on a set of performance parameters; and
      selecting the top-ranked requirement from the at least two of the plurality of requirements.

16. The non-transitory computer-readable medium of claim 15, wherein the computer-executable instructions are further configured for generating a common application using the top-ranked requirement from each of the at least one cluster.

* * * * *